US012806723B2

(12) United States Patent
Bene et al.

(10) Patent No.: US 12,806,723 B2
(45) Date of Patent: Nov. 24, 2026

(54) MACHINE TOOL WITH TWO INDEPENDENT CARRIAGES

(71) Applicant: FIDIA S.P.A., Turin (IT)

(72) Inventors: Giacomo Bene, Turin (IT); Giuseppe Morfino, Turin (IT)

(73) Assignee: FIDIA S.P.A., Turin (IT)

( * ) Notice: Subject to any disclaimer, the term of this patent is extended or adjusted under 35 U.S.C. 154(b) by 728 days.

(21) Appl. No.: 18/019,588

(22) PCT Filed: Aug. 5, 2021

(86) PCT No.: PCT/IB2021/057200
§ 371 (c)(1),
(2) Date: Feb. 3, 2023

(87) PCT Pub. No.: WO2022/029678
PCT Pub. Date: Feb. 10, 2022

(65) Prior Publication Data
US 2023/0294225 A1 Sep. 21, 2023

(30) Foreign Application Priority Data
Aug. 5, 2020 (IT) ........................ 102020000019342

(51) Int. Cl.
*B23Q 1/01* (2006.01)
*B23C 1/12* (2006.01)
(Continued)

(52) U.S. Cl.
CPC ............. *B23Q 1/012* (2013.01); *B23Q 1/017* (2013.01); *B23Q 1/621* (2013.01); *B23Q 5/385* (2013.01);
(Continued)

(58) Field of Classification Search
CPC ........... B23Q 1/01-1/017; B23Q 1/621; B23Q 1/626; B23Q 5/385; B23Q 11/001;
(Continued)

(56) References Cited

U.S. PATENT DOCUMENTS 2,902,875 A 9/1959 Finally et al.
4,550,626 A * 11/1985 Brouwer ................ B23Q 5/385 74/395
(Continued)

FOREIGN PATENT DOCUMENTS

CN 102056708 A 5/2011
CN 102405125 A 4/2012
(Continued)

OTHER PUBLICATIONS

Machine Translation of CN 102990479 A, which CN '479 was publishted Mar. 27, 2013.*
(Continued)

*Primary Examiner* — Erica E Cadugan
(74) *Attorney, Agent, or Firm* — Leason Ellis LLP

(57) ABSTRACT

A machine tool has a substantially straight guide element extending along a first axis; two carriages, which are arranged at a fixed distance from one another along the guide element and are capable of sliding together along the guide element; a slide, which is interposed between the two carriages, is carried by the two carriages and can slide relative to them along a second axis perpendicular to the first axis; and a milling head, which is carried by the slide and is configured to carry a milling tool.

5 Claims, 7 Drawing Sheets

(51) Int. Cl.

| | |
|---|---|
| ***B23Q 1/62*** | (2006.01) |
| ***B23Q 5/38*** | (2006.01) |
| ***B23Q 11/00*** | (2006.01) |
| *B23C 1/00* | (2006.01) |
| *B23Q 5/56* | (2006.01) |

(52) U.S. Cl.

CPC .......... *B23Q 11/0028* (2013.01); *B23C 1/002* (2013.01); *B23C 1/12* (2013.01); *B23Q 5/56* (2013.01); *Y10T 409/307112* (2015.01); *Y10T 409/307672* (2015.01); *Y10T 409/308288* (2015.01); *Y10T 409/308512* (2015.01); *Y10T 409/309576* (2015.01); *Y10T 409/309744* (2015.01)

(58) Field of Classification Search

CPC ............... B23Q 11/0028; Y10T 408/91; Y10T 409/309576; Y10T 409/307728; Y10T 409/308288; Y10T 409/306776; Y10T 409/307056–307112; Y10T 409/309744; B23C 1/002; B23B 39/006; B24B 7/005; B24B 7/224

USPC ................. 408/234; 409/235, 202, 212, 185, 409/190–191, 238

See application file for complete search history.

(56) References Cited

U.S. PATENT DOCUMENTS

| | | | | |
|---|---|---|---|---|
| 2008/0044246 | A1 * | 2/2008 | Gueli | B23Q 1/01 409/235 |
| 2012/0058872 | A1 * | 3/2012 | Roders | B23Q 1/621 409/235 |
| 2012/0328385 | A1 * | 12/2012 | Greffioz | B23Q 1/5462 409/137 |
| 2014/0020523 | A1 | 1/2014 | Yang et al. | |
| 2014/0020526 | A1 | 1/2014 | Yang et al. | |

FOREIGN PATENT DOCUMENTS

| | | | |
|---|---|---|---|
| CN | 102990479 | A | 3/2013 |
| CN | 108526914 | A | 9/2018 |
| DE | 102009013356 | | 9/2010 |
| EP | 1166953 | A2 * | 1/2002 |
| EP | 1362664 | A2 | 11/2003 |
| EP | 1362664 | B1 | 12/2005 |
| EP | 1750899 | | 2/2007 |
| IT | 202200013180 | A1 * | 12/2023 |
| JP | H10228317 | | 8/1998 |

OTHER PUBLICATIONS

International Search Report and Written Opinion in corresponding International Patent Application No. PCT/IB2021/057200, mailed Nov. 18, 2021 (13 pages).

Chinese Office Action in CN Application No. 202180062905.X, mailed Jul. 16, 2025, an English Translation attached hereto (16 pages).

* cited by examiner

MACHINE TOOL WITH TWO INDEPENDENT CARRIAGES

CROSS-REFERENCE TO RELATED APPLICATIONS

This Patent Application is a U.S. National Phase Application under 35 U.S.C. § 371 of International Patent Application No. PCT/IB2021/057200, filed on Aug. 5, 2021, which claims priority from Italian Patent Application No. 102020000019342, filed on Aug. 5, 2020, all of which are incorporated by reference, as if expressly set forth in their respective entireties.

TECHNICAL FIELD

The invention relates to a machine tool.

The invention has its preferred application in a computerized numerical control (CNC) milling machine having members that are movable along coordinated axes in order to move a milling tool within a work volume, to which reference will be made in the description below without because of this loosing in generality.

PRIOR ART

In the last decades, CNC milling machines were developed, which are provided with movable members with different degrees of freedom, so as to allow for a great flexibility in the machining of a piece to be processed. In particular, known milling machines can be programmed so as to carry out a wide range of different machining operations, depending on special needs.

In order to fulfil the requirements mentioned above, known milling machines comprise a plurality of members that are movable according to coordinated axes. These members can comprise, for example, a carriage that can slide along a guide in a first direction, for example a horizontal one, and a slide carried by the carriage in a projecting manner and movable, relative to the latter, along a second direction perpendicular to the first direction, for example a vertical one.

Hence, the carriage typically has a "cross-like" shape, since it has, on a first face of its, a first seat along an axis for the coupling to the guide and, on a second face of its opposite the first one, a second seat orthogonal to the first seat for the coupling to the slide.

Since the two seats cannot intersect one another, this necessarily leads to a projecting arrangement of the slide (and, hence, of the milling head) relative to the guide of the carriage. As a consequence, the weight of the carriage and of the slide, as well as the forces exchanged with the piece during the machining, determine significant bending moments relative to the guide, with potentially negative effects on the machining precision. In order to avoid these effects, the members of the machine need to be properly sized so as to ensure the necessary stiffness thereof, which leads to an increase in the weight and in the cost of the components as well as to dynamic problems.

SUBJECT—MATTER OF THE INVENTION

The object of the invention is at least partly overcome the drawbacks of the prior art.

In particular, the object of the invention is to provide a lighter machine tool with a smaller cost, which is capable of carrying out high-speed machining operations, ensuring at the same time a suitable quality of the machining.

According to the invention, there is provided a machine tool comprising:

- a substantially straight guide element extending along a first axis;
- two carriages, which are arranged at a fixed distance from one another along the guide element and are capable of sliding together along the guide element; and
- a slide, which is interposed between the two carriages, is carried by the two carriages and can slide relative to the two carriages along a second axis substantially perpendicular to the first axis;
- wherein said carriages are independent and are mechanically connected to one another solely by means of said slide.

Thanks to the invention, the bending moment acting upon the guide element is limited by the fact that the slide is arranged between the two carriages and, hence, can be placed close to the guide element.

In this way, the guide element and the relative support structure are not subjected to significant deformations, thus ensuring better performances in terms of machining precision.

Alternatively, the required precision being the same, the weight and the cost of the machine can be reduced.

Furthermore, thanks to the fact that the two carriages are independent of one another, by controlling the sliding of the two carriages along the guide element it is possible to ensure an adequate stiffness of the machine in order to fulfil requirements set by different operating conditions.

The technical advantages described above are more evident in large-sized machine tools designed according to the invention.

According to a preferred embodiment of the invention, the slide carries a machining head.

According to an embodiment of the invention, the guide element comprises at least one rail extending in a direction parallel to the first axis and each one of the carriages comprises at least one runner coupled to the rail in a sliding manner along the direction of the first axis and in a rigid manner in a direction perpendicular to the first axis.

In this way, the space taken up by the guide system is minimized, since the guide system does not require further constraint elements in the other directions.

In particular, the guide element comprises a first rack extending in a direction substantially parallel to the first axis; at least one of the two carriages comprising at least one motor provided with a toothed wheel, which meshes with the first rack so as to control the sliding of the carriages along the first rack.

In particular, one of the two carriages comprises a first motor and another one of the two carriages comprises a second motor, the first and second motor being provided with respective toothed wheels, which mesh with the first rack and are configured to exert respective torques in opposite directions upon the respective toothed wheels.

In this way, the clearances of the coupling between the toothed wheels and the first rack can be limited and a suitable precision in the movement of the carriages can be ensured.

More in detail, the first and the second motor are configured to control, in a coordinated manner, the torques exerted upon the respective toothed wheels so as to modulate the stiffness of the connection between the carriages and the slide in a direction substantially parallel to the first axis.

Basically, during rough-milling operations involving great forces, the two motors are controlled so as to exert opposite torques with a high modulus upon the respective toothed wheels so as to obtain a high-stiffness connection between the carriages and the slide.

During superficial finishing operations involving smaller forces, the two motors are configured to exert opposite torques with a smaller modulus upon the respective toothed wheels so as to obtain a connection between the carriages and the slide with a smaller stiffness, thus limiting wear.

In particular, the slide comprises a second rack extending in a direction substantially parallel to the second axis; at least one of the two carriages comprising at least one motor provided with a toothed wheel, which meshes with the second rack so as to control the sliding of the slide along the second rack.

In particular, one of the two carriages comprises a third motor and a fourth motor, which are provided with respective toothed wheels, which mesh with the second rack and are configured to exert respective torques in opposite direction upon the respective toothed wheels.

In this way, the clearances of the coupling between the toothed wheels and the second rack can be limited and a suitable precision in the movement of the slide can be ensured.

Alternatively, one of the two carriages comprises a third motor and the other one of the two carriages comprises a fourth motor, said third and fourth motor being provided with respective toothed wheels, which mesh with the second rack and are configured to exert respective torques in opposite directions upon the respective toothed wheels.

In this configuration, the clearances between the toothed wheels and the rack are limited by the weight force of the slide.

BRIEF DESCRIPTION OF THE DRAWINGS

Further features and advantages of the invention will be best understood upon perusal of the following description of a non-limiting embodiment thereof, with reference to the accompanying Figures, wherein.

PREFERRED EMBODIMENT OF THE INVENTION

Figure 1:
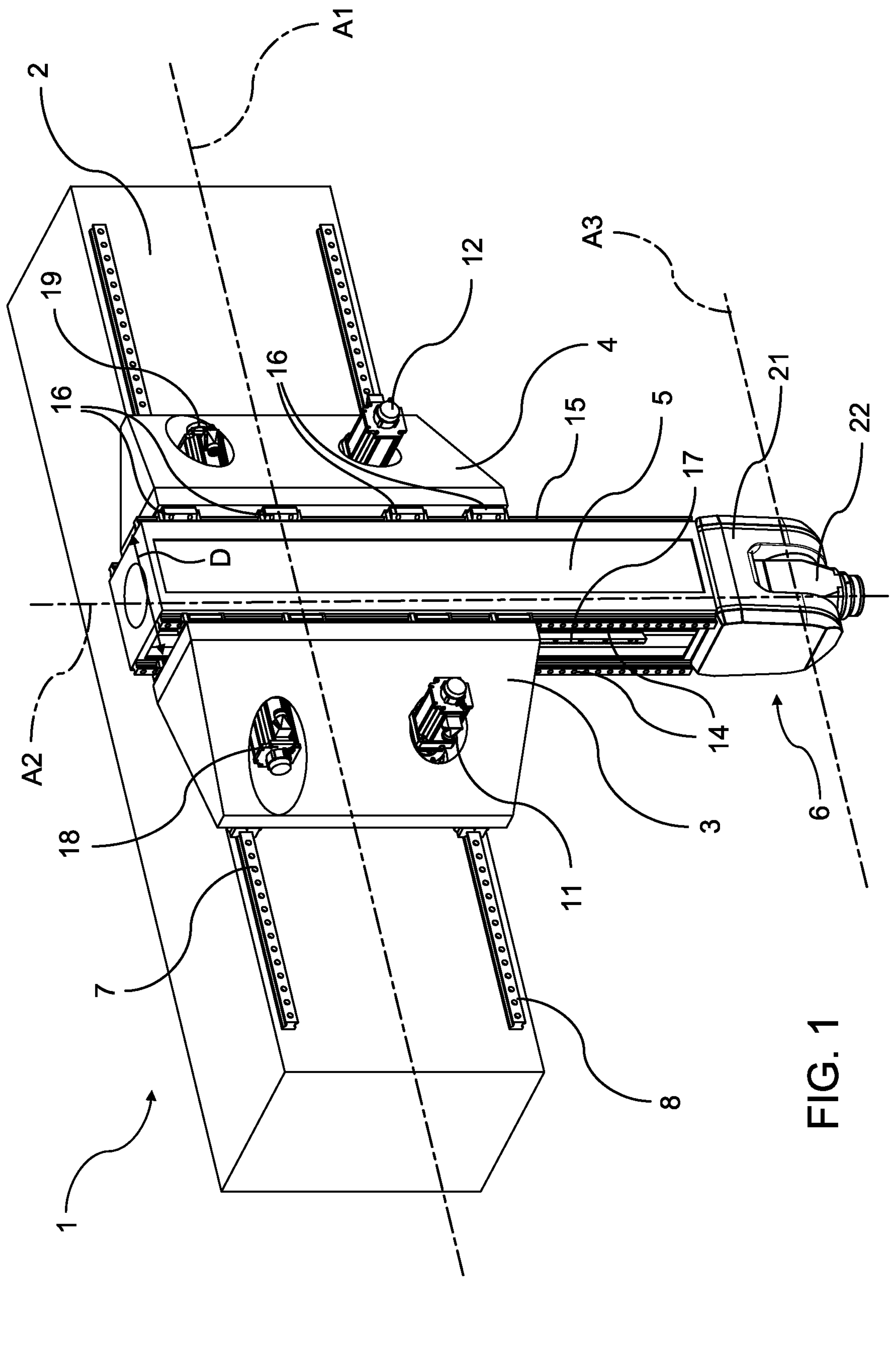
FIG. 1 is a perspective, partial view of a machine tool according to the invention.
Figure 2:
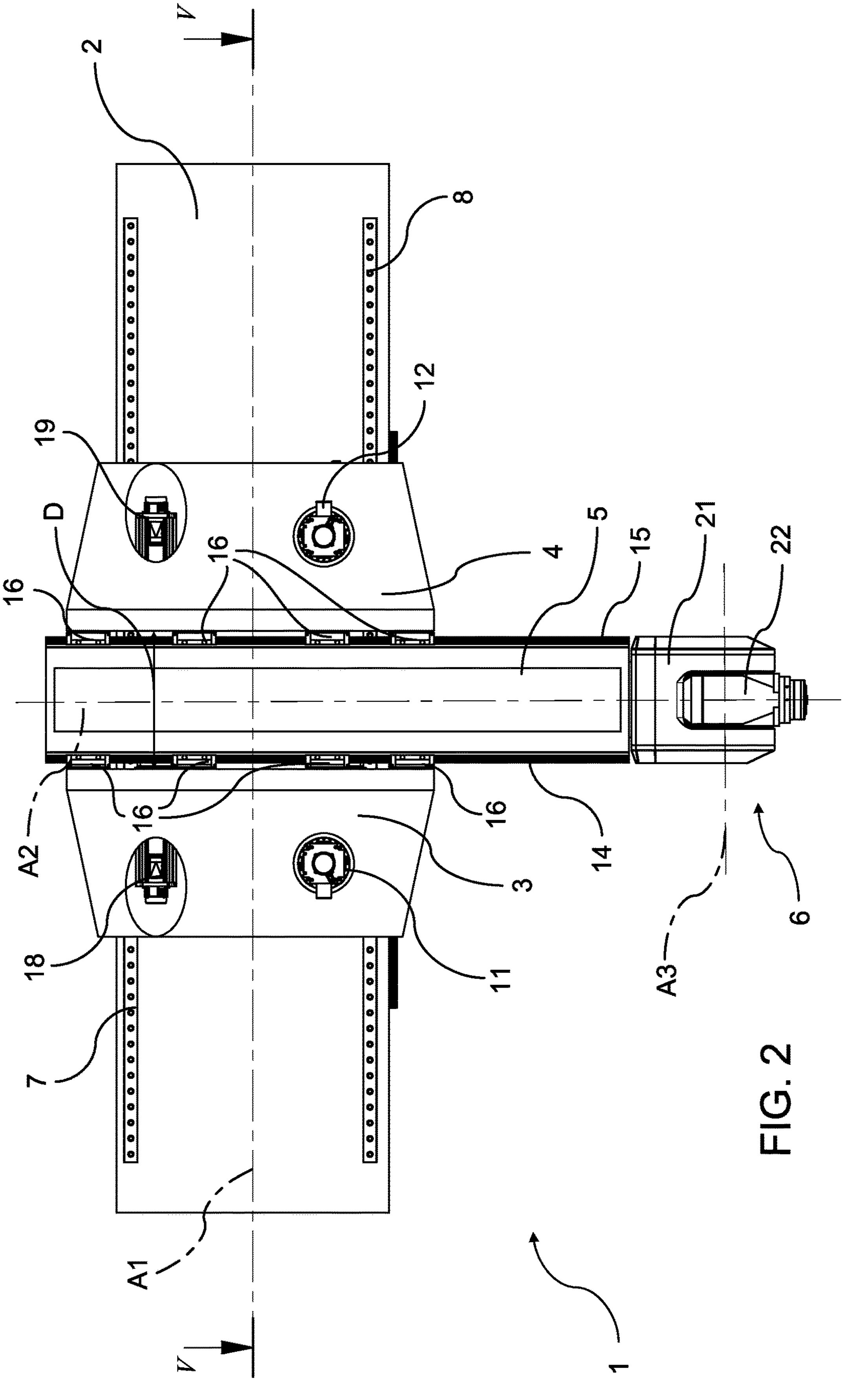
FIG. 2 is a front view of the machine tool of FIG. 1.

With reference to FIGS. 1 and 2, number 1 indicates, as a whole, a machine tool, in particular a milling machine, preferably a CNC milling machine. The milling machine 1 comprises a substantially straight guide element 2 extending along an axis A1, for example a horizontal one; two carriages 3 and 4, which are arranged at a fixed distance D from one another along the guide element 2 and are capable of sliding together along the guide element 2; a slide 5, which is interposed between the carriages 3 and 4, is carried by the carriages 3 and 4 and can slide relative to the carriages 3 and 4 along an axis A2 perpendicular to the axis A1, in particular a vertical one; and a milling head 6, which is carried by the slide 5 and is configured to carry a milling tool (which is not shown in the accompanying Figures).

The guide element 2 is supported by a fixed or movable support structure, which is not shown in the accompanying figures because it is not part of the invention. In particular, said support structure can assume different configurations. By way of example, the support structure comprises two vertical supports, each fixed to a respective end of the guide element 2, so as to define a gantry milling machine 1.

Figure 3:
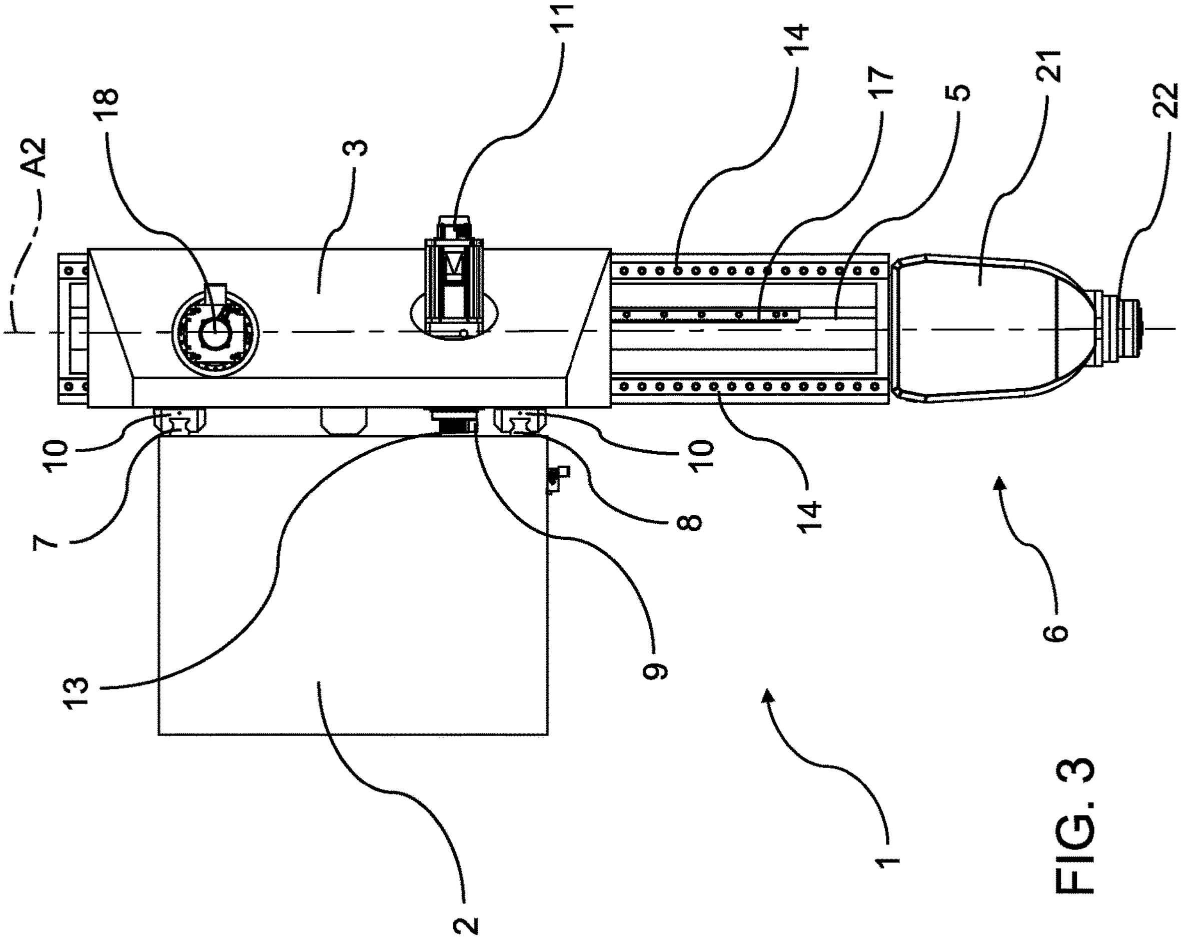
FIG. 3 is a side elevation view of the machine tool of FIG. 1.

With reference to FIGS. 1-3, the guide element 2 comprises a rail 7 and a rail 8, each extending in a direction that is substantially parallel to the axis A1. In particular, the rails 7 and 8 have a section shaped like a dovetail.

According to a variant of the invention, which is not shown in the accompanying Figures, the guide element 2 can comprise only one rail extending in a direction parallel to the axis A1. The number of rails of the guide element 2 can change and is not limited by the invention.

Figure 5:
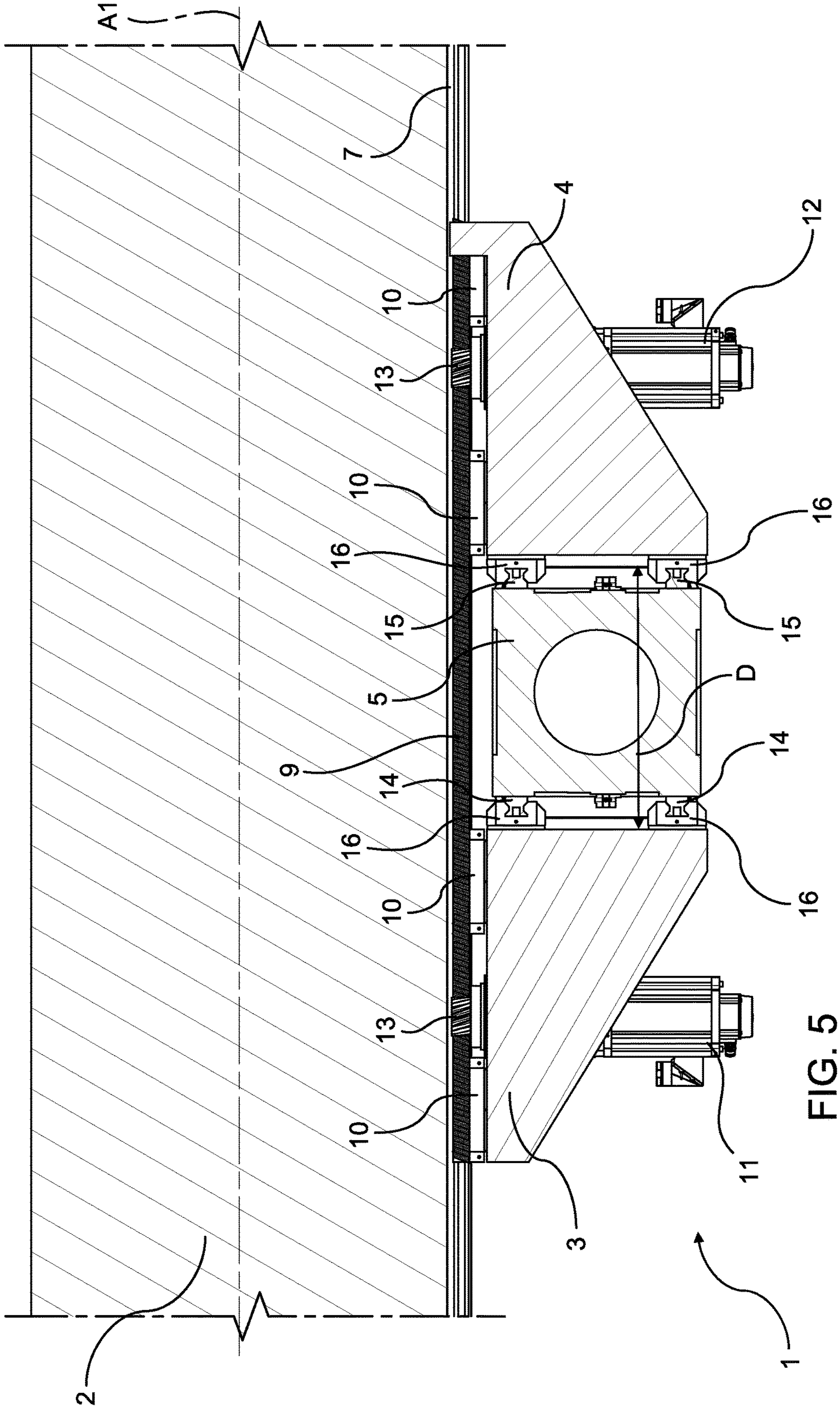
FIG. 5 is a sectional view of the machine tool of FIG. 2 along section line V-V.

With reference to FIGS. 3 and 5, the guide element 2 comprises a rack 9 extending in a direction that is parallel to the axis A1 and, hence, parallel to the rails 7 and 8.

Figure 4:
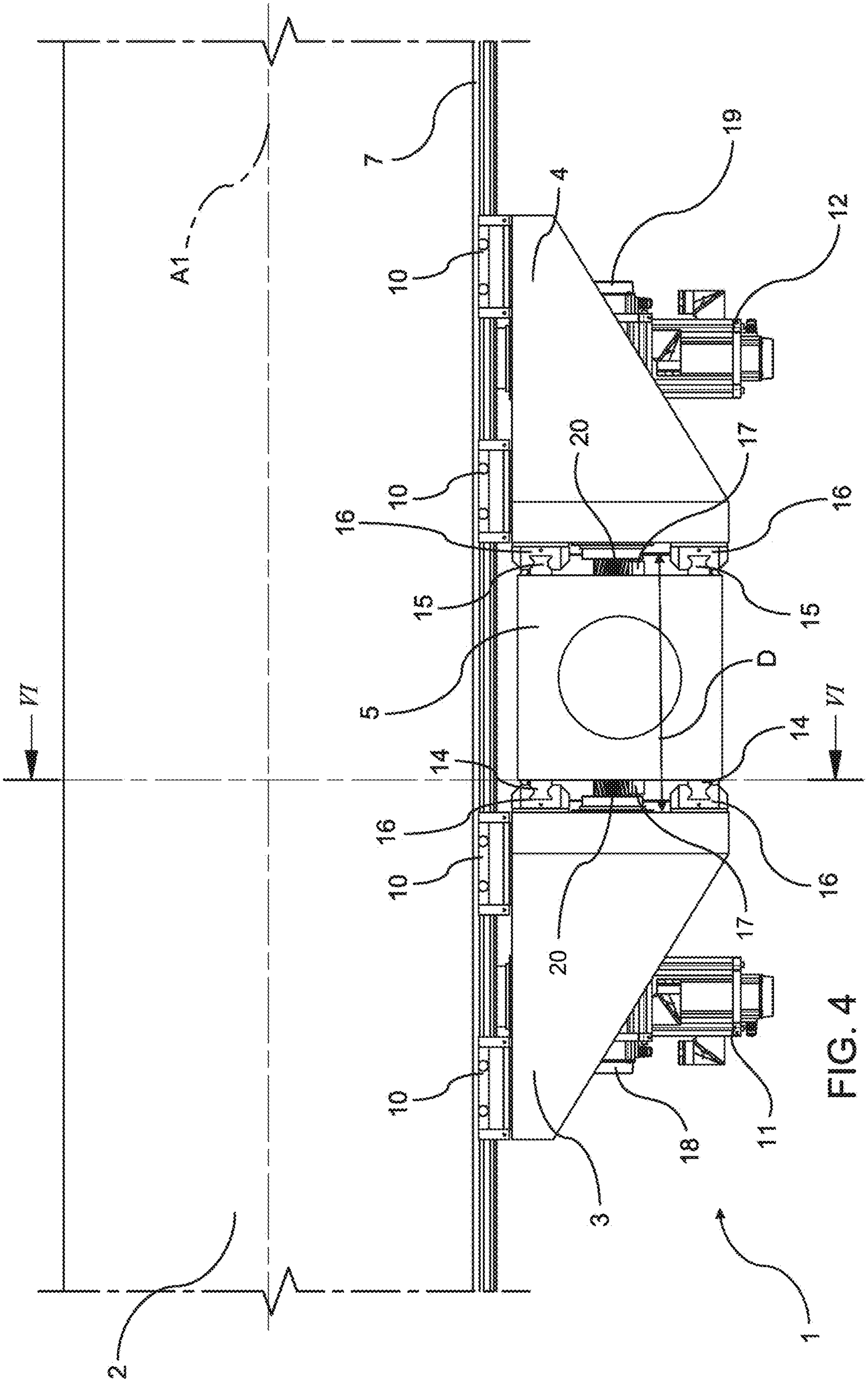
FIG. 4 is a top view of the machine tool of FIG. 1.
Figure 6:
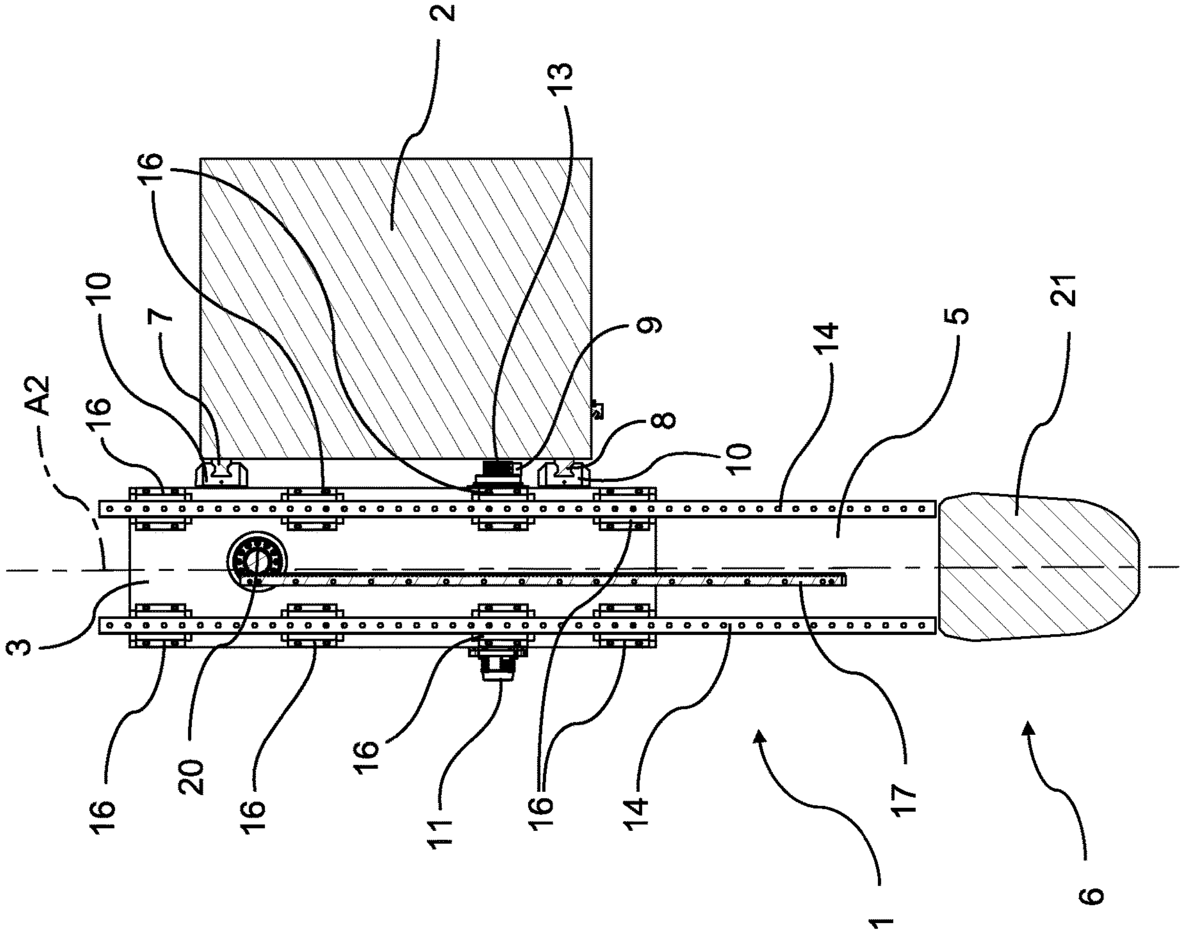
FIG. 6 is a sectional view of the machine tool of FIG. 4 along section line VI-VI.

With reference to FIGS. 3, 4 and 6, each one of the carriages 3 and 4 comprises four runners 10, two of them being configured to slide on the rail 7 and the other two being configured to slide on the rail 8. In particular, each runner 10 is shaped so as to be coupled to the dovetail-shaped section of the rails 7 and 8 in a sliding manner along the direction of the axis A1 and in a rigid manner in the directions orthogonal to the axis A1, so as to only allow the carriages 3 and 4 to slide along the rails 7 and 8 and avoid the relative movement of the carriages 3 and 4 relative to the guide element 2 in all other directions.

According to a variant of the invention, which is not shown in the accompanying Figures, each carriage 3 and 4 is provided with only two runners 10, one of them being configured to slide on the rail 7 and the other one being configured to slide on the rail 8. The number of runners 10 of the two carriages 3 and 4 can change and is not limited by the invention.

With reference to FIGS. 1-5, the carriage 3 comprises an electric motor 11 and the carriage 4 comprises an electric motor 12. Each electric motor 11, 12 is provided with a respective toothed wheel 13 (FIGS. 3 and 5), which meshes with the rack 9 (FIGS. 3 and 5).

In particular, the motors 11 and 12 are configured to exert respective torques in opposite directions upon the respective toothed wheels 13 (FIGS. 3 and 5) so as to limit the clearances of the coupling between the toothed wheels 13 (FIGS. 3 and 5) and the rack 9 (FIGS. 3 and 5).

With reference to FIGS. 1-7, the slide 5 is oblong in the direction A2, has a substantially rectangular section and comprises at least two rails 14 and 15, each facing the respective carriage 3, 4 and extending in a direction that is parallel to the axis A2. In particular, the rails 14 and 15 have a section shaped like a dovetail.

Each carriage 3, 4 comprises at least one slider 16, which is configured to slide along the respective rail 14, 15. In particular, each slider 16 is shaped so as to be coupled to the dovetail-shaped section of the rails 14 and 15 in a sliding manner along the direction of the axis A2 and in a rigid manner in the directions orthogonal to the axis A2, so as to only allow the slide 5 to slide along the axis A2 and avoid the relative movement of the slide 5 relative to the carriages 3 and 4 in all other directions.

In the specific case described and shown herein, the slide 5 comprises two rails 14 and two rails 15. The carriage 3 comprises eight sliders 16, four of them being configured to slide on one of the two rails 14 and four of them being configured to slide on the other one of the two rails 14. The carriage 4 comprises eight sliders 16, four of them being configured to slide on one of the two rails 15 and four of them being configured to slide on the other one of the two rails 15. The number of rails 14 and 15 and of sliders 16 can change and is not limited by the invention.

With reference to FIG. 4, the slide 5 comprises two racks 17, each extending in a direction that is parallel to the axis A2 and, hence, parallel to the rails 14 and 15.

Furthermore, the carriage 3 comprises an electric motor 18 and the carriage 4 comprises an electric motor 19. Each electric motor 18, 19 is provided with a respective toothed wheel 20, which meshes with the respective rack 17.

In particular, the motors 18 and 19 are configured to exert respective torques in opposite directions upon the respective toothed wheels 20 so as to limit the clearances of the coupling between the toothed wheels 20 and the rack 17.

According to a variant of the invention, which is not shown in accompanying Figures, the sole carriage 3 comprises a motor.

With reference to FIGS. 1-3, the milling head 6 comprises two bodies 21 and 22, which are articulated to one another, and a milling tool, which is carried by the body 22 and is not shown in the accompanying Figures.

In particular, the body 21 is connected to the slide 5 so as to rotate relative to the slide 5 around the axis A2 and the body 22 is connected to the body 21 so as to slide relative to the body 21 around an axis A3 that is perpendicular to the axis A2.

Furthermore, the milling head 6 comprises motors and/or actuators, which are not shown in the accompanying Figures and are configured to move the bodies 21 and 22 and to start the rotation of the milling tool, which is not shown in the accompanying Figures.

In FIGS. 1-7, the axis A1 of the guide element 2 is horizontal and the axis A2 is vertical; according to a variant of the invention, which is not shown in the accompanying Figures, the axis A1 could be vertical and the axis A2 could be horizontal.

In use and with reference to FIGS. 1-4, the motors 11 and 12 start the sliding of the carriages 3 and 4 along the guide element 2. In particular, in order to start the sliding of the carriages 3 and 4 in a first direction, the power of one of the motors 11 and 12 is increased so as to increase the torque of one of the two motors 11 and 12 compared to the other one of the two motors 11 and 12. In order to start the sliding of the carriages 3 and 4 in a second direction, which is contrary to the first direction, the power of the other one of the two motors 11 and 12 is increased.

In particular, the motors 11 and 12 control, in a coordinated manner, the torques exerted upon the respective toothed wheels 13 so as to modulate the stiffness of the connection between the carriages 3, 4 and the slide 5 depending on the forces involved.

Similarly, the motors 18 and 19 start the sliding of the slide 5 relative to the carriages 3 and 4 in the direction of the axis A2.

The bodies 21 and 22 are oriented so as to move the milling tool, which is not shown in the accompanying Figures, within a work volume based on the specific machining needs.

Figure 7:
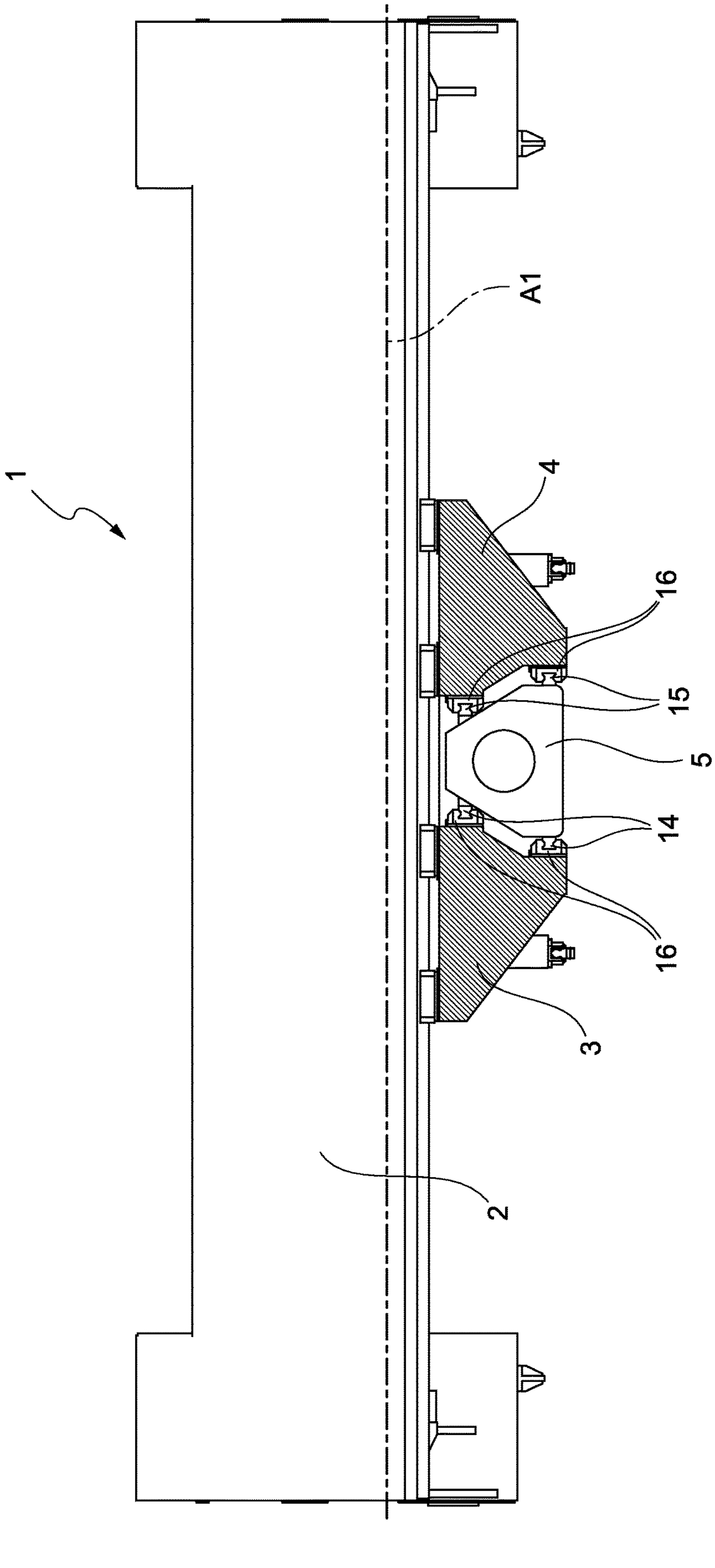
FIG. 7 is a partially sectional, plan view of a further variant of the machine tool of FIG. 1.

FIG. 7 shows a variant in which the slide 5 has a tapered section, instead of a substantially rectangular one; therefore, the two rails 14 and the two rails 15 on the opposite sides of the slide 5 are not coplanar to one another, but are staggered in a direction parallel to the axis A1. The carriages 3, 4 are shaped in a corresponding manner, on their side facing the slide 5, and the sliders 16 of each carriage 3, 4 are arranged on planes which, in turn, are staggered in order to cooperate with the corresponding rails 14 or 15.

Finally, the invention can evidently be subjected to further variants to the embodiments described herein, though without going beyond the scope of protection set forth in the appended claims.

For example, the motors controlling the movement of the carriages 3, 4 along the axis A1 and the sliding of the slide 5 along the axis A2 could be hydraulic or pneumatic motors.

The invention claimed is:

1. Machine tool comprising:

a straight guide element (2) extending along a first axis (A1);

two carriages (3, 4) arranged at a fixed distance (D) with respect to each other along the guide element (2) and slidable together along the guide element (2); and a slide (5) interposed between the two carriages (3, 4), carried by the two carriages (3, 4) and slidable in relation to the two carriages (3, 4) along a second axis (A2) perpendicular to the first axis (A1), wherein the guide element (2) comprises a first rack (9) extending in a direction parallel to the first axis (A1);

wherein one of the two carriages (3, 4) comprises a first motor (11) and the other of the two carriages (3, 4) comprises a second motor (12), the first and second motors (11, 12) being fitted with respective toothed wheels (13) which mesh with the first rack (9) and are configured to exert respective torques in opposite directions upon the respective toothed wheels (13);

wherein the first and the second motor (11, 12) are configured to control, in a coordinated manner, the torques exerted upon the respective toothed wheels (13) so as to modulate the stiffness of the connection between the carriages (3, 4) and the slide (5) in a direction parallel to the first axis (A1);

wherein the first and the second motor (11, 12) are configured to exert opposite torques with a high modulus upon the respective toothed wheels (13) during rough-milling operations to obtain a high-stiffness connection between the two carriages (3, 4) and the slide (5); and wherein the first and the second motor (11, 12) are configured to exert opposite torques with a smaller modulus upon the respective toothed wheels (13) during superficial finishing operations to obtain a connection between the two carriages (3, 4) and the slide (5) with a smaller stiffness.

2. Machine tool as claimed in claim 1, comprising a machining head (6) carried by the slide (5) and configured to carry a machining tool.

3. Machine tool as claimed in claim 1, where the guide element (2) comprises at least one rail (7; 8) extending in a direction parallel to the first axis (A1), and each of the carriages (3, 4) comprises at least one respective runner (10) coupled to the at least one rail (7, 8) slidably along the direction of the first axis (A1) and rigidly in a direction perpendicular to the first axis (A1).

4. Machine tool as claimed in claim 1, wherein the slide (5) comprises at least two rails (14, 15), each of which is facing the respective carriage (3; 4) and extends in a direction parallel to the second axis (A2); each carriage (3; 4) being fitted with at least one respective slider (16) coupled to the respective rail (14, 15) in a sliding way along the direction of the second axis (A2) and rigid in a direction perpendicular to the second axis (A2).

5. Machine tool as claimed in claim 1, wherein the slide (5) comprises a second rack (17) extending in the direction parallel to the second axis (A2); at least one of the two carriages (3; 4) comprising at least one respective motor (18; 19) fitted with a respective toothed wheel (20) which engages with the second rack (17).

* * * * *